Patented July 5, 1949

2,475,529

UNITED STATES PATENT OFFICE 2,475,529

FLUORESCENT DEVICE AND METHOD OF MAKING THE SAME

Joseph L. Switzer, Cleveland Heights, and Robert C. Switzer, South Euclid, Ohio

No Drawing. Original application October 9, 1941, Serial No. 414,285. Divided and this application April 12, 1949, Serial No. 87,020

2 Claims. (Cl. 250—71)

This invention relates to a luminescent composition, and, more particularly, to a thermo-set fluorescent resinous composition and a thermo-setting fluorescent resinous fluid. This application is a division of our copending application Serial No. 414,285, filed October 9, 1941, which, in turn, is a continuation-in-part of our application, Serial No. 228,802, filed September 7, 1938, now abandoned. "Fluorescence," as that phenomenon is considered in this specification and claims, includes the phenomenon of phosphorescence.

As pointed out in the above-identified application, heretofore fluorescent compositions, particularly fluorescent coatings, have tended to deteriorate over short periods of time if the compositions were exposed to sunlight or other light containing actinic radiations, hereinafter simply termed "light." Therefore, fluorescent compositions have been generally unsatisfactory heretofore upon prolonged exposure to light, and it is a primary object of this invention to provide a fluorescent composition and also a coating composition which will withstand prolonged exposure to light as well as most commercially acceptable non-fluorescent coating compositions, such as paints, lacquers, and the like, which will withstand such exposure.

While the inability of the fluorescent compositions known to the prior art to withstand prolonged light exposure is not fully understood, we have found by our discoveries, which will be set forth below, that loss in fluorescence upon exposure to light is not a purely inherent and inescapable characteristic of fluorescent compositions, as was taught by apparently reliable prior art. In other words, at the time we commenced our research for a material which would maintain a substantially stable fluorescent brightness under light exposure, it was generally accepted that prolonged exposure to light exhausted brilliantly fluorescent substances of their fluorescent properties and the problem was to find a new fluorescent substance or substances which would retain brilliant fluorescence after a prolonged exposure to light. Through a series of comparative life tests in which samples of known fluorescent materials were exposed to actinic radiations only and other samples were exposed to both actinic radiations and the atmosphere, we have discovered that the loss in fluorescence of fluorescent substances and fluorescent compositions containing a fluorescent ingredient is due to either the actual chemical decomposition of the fluorescent substances in the presence of moisture vapor or like reactive vapors and gases and/or the reaction of the fluorescent ingredient with its vehicle. We also discovered that actinic radiations, such as those found in sunlight, accelerate the decomposition and/or reaction of the fluorescent substances but were apparently not solely responsible for the deterioration of the fluorescent substances.

Having discovered the foregoing facts, the problem of obtaining a composition having stable fluorescent brilliance became one of finding a suitable vehicle which would be inert with respect to the fluorescent ingredients and substantially completely impervious to moisture vapor and like reactive gases. A further requirement of a suitable vehicle was that it should be transparent to the visible light emitted by the fluorescent ingredients and which would not yellow and, therefore, lose its transparency upon exposure to weathering conditions. Further, in the majority of applications, the fluorescent ingredients were ingredients which were required to fluoresce under invisible fluorescigenous radiations. Therefore, the vehicle should also be transparent to invisible fluorescigenous radiations.

As a result of the foregoing discoveries and known facts, we assumed that a transparent non-yellowing vehicle which was non-reactive with the fluorescent ingredients and which would substantially completely envelope the fluorescent ingredients would produce a fluorescent coating composition which would retain the fluorescent brightness of the ingredients upon exposure to light. This assumption was apparently confirmed by carefully compounded paints comprising a fluorescent pigment, a non-reactive air-drying solvent, and a chemically indifferent transparent resin, such as a methacrylate or polystyrene resin, for example, but such paints would only maintain the fluorescent brightness of the pigments until the vehicle tended to break down under weathering conditions.

In endeavoring to find a vehicle for fluorescent pigments more stable than the air-drying type, we experimented with thermo-setting resins. Known thermo-setting transparent and non-yellowing coating vehicles comprised three general classes, phenolic resins, alkyd resins, and plasticized alcohol modified urea-formaldehyde resins. The advantages of such thermo-setting resins were that, after thermo-setting, they formed hard, dense compositions characterized by their insolubility and infusibility. Furthermore, such thermo-set resins generally adhered or fused firmly to non-absorptive surfaces, such as metal or glass. It is an object of this invention to provide a fluorescent composition and resinous coating fluid possessing the advantages of thermo-setting vehicles, but, in general, thermo-setting vehicles are very reactive with respect to suitable fluorescent pigments and, as expected, the heat employed to thermo-set the vehicles rapidly accelerates the reaction between the vehicle and the fluorescent pigments.

The foregoing discoveries seemed to ban the use of substantially an entire class of brilliantly fluorescent ingredients, namely, fluorescent dyes. Obviously, the only manner in which dyes could be enveloped in a vehicle was to dissolve the dye in the vehicle or to obtain a suspension which would substantially amount to a solution. With a few exceptions, fluorescent dyes were not soluble in suitable non-yellowing air-drying resins, such as the methacrylate or polystyrene types. Further, substantially all fluorescent dyes are notably unstable as compared with fluorescent pigments. When fluorescent dyes were dissolved or suspended in known non-yellowing thermo-setting resins, the dyes deteriorated rapidly during the process of thermo-setting the resins.

We have, however, discovered that an excellent non-reactive thermo-setting resinous vehicle for fluorescent pigments and dyes consists of an alcohol-modified urea-formaldehyde resin containing no plasticizer. For example, such resin may be butyl alcohol-modified urea-formaldehyde. Such alcohol-modified urea-formaldehyde resin is very dense and glass-hard, transparent to both visible and ultra-violet light, and non-yellowing. A film of such resin, however, is very brittle and non-adherent to non-absorptive surfaces, such as metal, although it will form a very strong bond to glass. As a result of the brittleness of a film of alcohol-modified urea-formaldehyde resin, this resin was never used heretofore in a coating composition vehicle except in combination with plasticizers, usually alkyds. Why fluorescent pigments and dyes do not react with alcohol-modified urea-formaldehyde resins in the absence of plasticizers, particularly during the application of heat to thermo-set the resin, is not understood. Neither is it understood why fluorescent dyes are soluble in this one type of resin and are not generally soluble in other non-reactive resins. However, we have found that substantially all known fluorescent dyes are soluble to a certain extent, at least, in non-plasticized alcohol-modified urea-formaldehyde resins and, when dissolved in the thermo-set resin, the fluorescent brightness of the dye is stabilized under exposure to light and atmospheric conditions.

Another transparent thermo-setting resin which will dissolve many fluorescent dyes is urea-formaldehyde resin. Such resin, when thermo-set, is extremely hard, dense, brittle, and incompatible with plasticizers. This resin has never been used as a coating composition vehicle, since it has no appreciable adhesion or film strength and will shatter substantially spontaneously when thermo-set as a film or sheet.

The thermo-set fluorescent dyed resinous compositions made according to our invention are hard, dense, impervious to reactive gases, and will maintain brilliant fluorescence after prolonged exposure to light under comparatively severe weathering conditions. We have also found that the fluorescent dyed resinous coating compositions will not only withstand crazing and peeling when applied and employed according to the methods we have devised but may also be applied and employed with film thicknesses several times greater than that usually employed in thermo-setting resinous coating compositions.

Our manner of employing the dyed coating composition made according to our invention may be in one of the following general methods, namely, by partly or completely impregnating a fibrous sheet with the fluorescent dyed resinous liquid, air-drying the solvent, and then thermo-setting the resin; or by dissolving a fluorescent dye in the resin, thermo-setting the dyed resin, grinding the resinous composition into a fine pigment, and then dispersing the pigment into any suitable vehicle.

As specific examples of our invention, the following are set forth for purposes of illustration and not by way of limitation:

*Example 1.*—A plurality of fibrous sheets, such as cloth or paper, are impregnated, as by dipping, with a butyl alcohol solution of alcohol-modified urea-formaldehyde resin, or other suitable thermo-setting resins, and then air-dried. The sheets are preferably white or the resin may contain a dispersion of white or other light reflecting non-fluorescent pigment. Another fibrous sheet is then impregnated with a butyl alcohol solution of alcohol-modified urea-formaldehyde resin, having proper viscosity for dipping, and containing not more than 5% nor less than 0.2% by weight of the solid resin of a fluorescent dye, such as meta diethylaminophenol-phthalein, dissolved in the resin. After the sheet impregnated with the fluorescent resin is air-dried, it is placed at the top or bottom of a stack of sheets impregnated with the non-fluorescent material in a suitable heated press. With the press heated from 150° F. to 300° F., the stack of impregnated sheets is subjected to pressure ranging between 3500 to 1500 pounds per square inch to fuse the thermo-setting resin into a dense, impervious mass enclosing the fibrous sheets. The time the sheets are kept in the press depends, of course, upon the temperatures and pressures employed. Thus, with four or five sheets impregnated with non-fluorescent resin and an outer sheet impregnated with the fluorescent dyed resin placed in a press under 2500 pounds per square inch pressure and maintained at 250° F. for one-half hour, a dense, hard sheet, having a plurality of lamina of fibrous material and a fluorescent surface, will be formed. The surface of the sheet will retain its fluorescent brightness under prolonged exposure to light. Obviously, both the top and bottom sheets, or all the sheets stacked in the press, may be impregnated with the dyed resin, but since it is usually desired to have only the surface of the fused sheet fluorescent, it is usually sufficient to have only one, or two, outer lamina impregnated with the fluorescent resin. Also, the practise of employing metal slip sheets to separate several stacks of impregnated fibrous sheets may be followed so that several fused sheets may be obtained in one press operation. Further, the practise of covering the stacks with non-adherent material or like standard practises to prevent the resinous mass from sticking in the press may be followed.

*Example 2.*—A fibrous sheet is impregnated with an aqueous suspension of urea-formaldehyde resin containing in solution in the resin not more than 5% nor less than 0.2% by weight of the solid resin of fluorescent dye, such as p,p' di [p'' (p''' aminobenzolylamino) benzoylamino] stilbene o,o' di (sodium sulphonate). The air-dried sheet is then stacked with other sheets impregnated with a suitable thermo-setting resin.

The stacked sheets are placed in a heated press and fused into a single laminated sheet in the manner described in Example 1.

*Example 3.*—A strong paper, such as 140 pound photogelatine printing stock may be coated, by means of roll coating equipment, for example, with a 50% butyl alcohol solution of an alcohol-modified urea-formaldehyde resin containing in solution not more than 5% nor less than 0.2% by weight of the solid resin of a fluorescent xanthene basic dyestuff, such as the ethyl ester of meta ethylaminophenol-phthalein. This fluorescent coating composition is preferably applied in a plurality of thin coats with a short drying period allowed between coats so that the first coats will partially impregnate the surface of the paper stock and the subsequent coats will build up upon the first coats. It is then baked in a kiln at temperatures ranging from 150° to 300° F., the time the sheet remains in the kiln depending upon the temperatures employed, to fuse the thermo-setting resin into a dense, impervious film partly impregnated in the surface of the paper. Thus, a glassy, hard, luminescent film, resistant to light exposure under atmospheric conditions, will be formed on the surface of the paper if the air-dried coating is baked at 200° F. for two hours or 250° F. for one hour.

*Example 4.*—For use in air-drying coatings or in thermo-setting or thermoplastic coatings requiring great flexibility, our fluorescent dyed resinous composition may be employed as follows. A suitable fluorescent dye, such as meta ethylaminophenol-phthalein is mixed with a fresh aqueous suspension of urea-formaldehyde resin where the dye enters into solution with the resin. Upon aging, the resin will coagulate and the suspending medium is then decanted. The coagulated mass is then baked to form a hard, brittle thermo-set resinous composition. Due to the brittle infusible nature of the thermo-set resin, it may be ground into a fine, nearly impalpable powder which is then dispersed into any suitable transparent non-yellowing vehicle, such as a solution of an acrylic or polystyrene resin.

*Example 5.*—Another manner of employing our resinous composition as a pigment for an air-drying vehicle is to dissolve a desired quantity of a fluorescent dye, such as the ethyl ester of meta diethylaminophenol-phthalein, in a butyl alcohol solution of alcohol-modified urea-formaldehyde resin. Into the solution of alcohol, dye, and resin is mixed a sufficient quantity of low-test gasoline to coagulate the resin. After decanting the liquid, the resinous mass is then baked, ground, and dispersed in a suitable vehicle in the manner described in Example 4.

By the foregoing examples, we have shown our invention as a composition of matter wholly or partly impregnated in a reinforcing material, and as a pigment for use in suitable vehicles. Obviously, this invention is not limited to its use in conjunction with the disclosed materials to which the luminescent composition is applied or which are incorporated therein. Furthermore, while the peculiar property of urea-formaldehyde resin and alcohol-modified urea-formaldehyde resin containing no plasticizers to dissolve and stabilize fluorescent dyes has been particularly useful in opening up new fields of use for fluorescent dyes, it should not be apparent that these same pure resins are also non-reactive with fluorescent pigments and will serve to envelope and stabilize them. Thus, our methods of handling dyed urea-formaldehyde and alcohol-modified urea-formaldehyde resins may be also employed in handling these same resins, termed generically urea-formaldehyde condensation products, having incorporated therein fluorescent pigments such as the well known fluorescent zinc sulphide and cadmium sulphide pigments.

As pointed out in our prior applications, our fluorescent composition or coating may be decorated or formed in many ways for use as signs, posters, displays, and the like. A particularly important application of this invention has been found in its use as name-plates or instrument dials and panels which are printed or decorated with non-fluorescent substances. As illustrations, by way of example, and not by way of limitation, the following examples of printing upon a surface comprised of our fluorescent composition are set forth:

*Example A.*—A sheet having a surface of our fluorescent composition is over-printed by the well-known "silk screen" process with an alcohol solution of alcohol-modified urea-formaldehyde resin carrying a dispersion of non-fluorescent ingredients or of ingredients fluorescing a color different from the color of the fluorescent surface to which the solution is applied. The overprinted solution is then air-dried and baked to fuse the urea-formaldehyde resin to the fluorescent surface. This manner of decorating a surface is particularly useful for name-plates and instrument panels which are likely to be subjected to wear or abrasion, since the resultant glassy surface is extremely resistant to scratching.

*Example B.*—A sheet having a surface of our fluorescent composition is reverse-printed by lithography, for example, with a non-fluorescent ink to form a mask defining fluorescent digits, letters and/or symbols. If the fluorescent surface is too rough to be printed accurately or with the required degree of fineness, or, if the fluorescent surface is not receptive to the non-fluorescent ink, the surface may be rendered smooth and ink receptive by coating the fluorescent surface prior to printing with a suitable smooth, ink-receptive clear lacquer. The reverse printed surface is then over-coated with a transparent lacquer, preferably an alcohol solution of alcohol-modified urea-formaldehyde resin air-dried and fused upon the reverse-printed surface. In order to minimize glare, the transparent over-coating may be abraded to impart a satin finish. This manner of decorating a fluorescent surface is particularly useful when sharp, fine definition of digits, letters, and/or symbols is required.

*Example C.*—A transparent film, such as a film of vinyl copolymers, for example, is printed in reverse with a non-fluorescent ink. The printed surface of the film is then laminated to an article having a surface of our fluorescent composition, either by heat and pressure when the film is thermo-adhesive or by means of a suitable transparent adhesive. To minimize glare, the surface of the film may be abraded after lamination, or, in the case of thermo-plastic films, if the surface of the plate or roll which presses and laminates the film to the fluorescent surface has a roughened or satin finish, such a finish will be imparted to the laminated film. This manner of decorating is also particularly useful when sharp definition of fluorescent characters is required.

*Example D.*—A sheet having a surface of our fluorescent composition is over-coated with a suitable clear non-yellowing lacquer and then covered with a suitable black or similar visible light-absorbing lacquer. Both the over-coated clear and the black covering lacquers are preferably thermo-setting lacquers to provide a tough wear and scratch resistant surface. The black covering lacquer is then etched or engraved through to the clear over-coat to reveal the fluorescent surface. While this method does not afford the speed of printing, as in the foregoing methods, it does permit the production of uniformly accurate engraved dials more rapidly and cheaply than engraved dials known to the prior art. In the prior art, the most accurate luminescent dials were obtained by engraving black metal plates and then hand-filling the engraved plates with luminescent material, such as radium paint. Our method eliminates the tedious and non-uniform hand filling and the speed of engraving through the relatively soft and thin lacquer is obviously greater than the speed of engraving metal to a greater depth.

From the foregoing, it is apparent that this invention is not limited to the particular application or manner of using it, but, in view of this disclosure, may be modified and varied by those skilled in the art from the preferred embodiments and applications we have disclosed. This invention, therefore, is not limited to the particular embodiment disclosed, either in whole or in part, but only by the following claims.

What is claimed is:

1. The method of making a fluorescent device for use at a distance from a source of fluorescigenous radiations, comprising impregnating a plastic material, while in a plastic condition, with a fluorescent dye and adhering a backing of white non-fluorescent cellulose material to said fluorescent material so that when fluorescigenous radiations are directed upon said plastic material impregnated with fluorescent dye, the fluorescent energy within the plane of the plastic material is greatly increased.

2. A fluorescent device for use at a distance from a source of fluorescigenous radiations comprising a front member of plastic material impregnated with a fluorescent dye and a back member of non-fluorescent white cellulose material, the two members being adhered together to form a unitary structure so that, when fluorescigenous radiaitons are directed upon said front member impregnated with a fluorescent dye, the fluorescent energy within the plane of the front member is greatly increased.

JOSEPH L. SWITZER.
ROBERT C. SWITZER.

REFERENCES CITED

The following references are of record in the file of this patent:

UNITED STATES PATENTS

| Number | Name | Date |
|---|---|---|
| 1,188,655 | Hewitt | June 27, 1916 |
| 1,321,024 | Frank | Nov. 4, 1919 |
| 1,364,950 | O'Hara | Jan. 11, 1921 |
| 1,610,747 | Colton | Dec. 14, 1926 |
| 1,967,261 | Ripper | July 24, 1934 |
| 2,033,976 | Dreyfus | Mar. 17, 1936 |
| 2,037,793 | Jacobson | Apr. 21, 1936 |
| 2,039,734 | Meder | May 5, 1936 |
| 2,084,526 | Grenier | June 22, 1937 |
| 2,113,090 | McKeag | Apr. 5, 1938 |
| 2,116,977 | Laise | May 10, 1938 |
| 2,275,290 | Dreyer | Mar. 3, 1942 |